March 21, 1939.  R. E. GLOVER  2,151,321
SUPPORT FOR HOLLOW BODIES
Filed Aug. 1, 1936
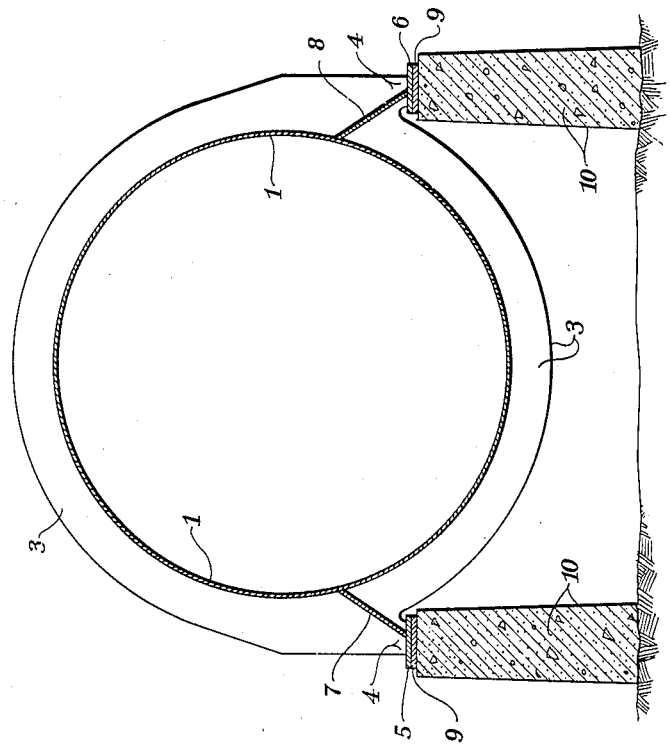
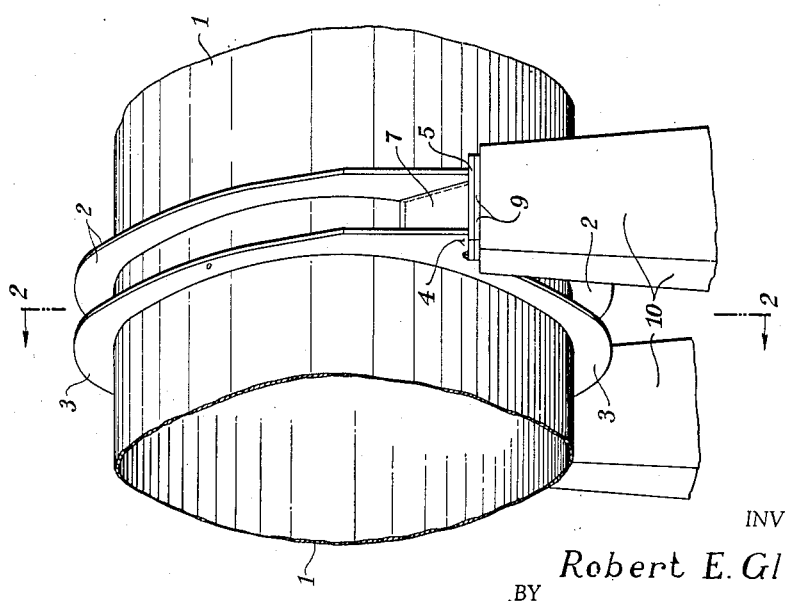
INVENTOR.
Robert E. Glover
BY
Benj. R. Newcomb
ATTORNEY.

Patented Mar. 21, 1939

2,151,321

UNITED STATES PATENT OFFICE 2,151,321

SUPPORT FOR HOLLOW BODIES

Robert E. Glover, Denver, Colo., assignor to Universal Hydraulic Corporation, Denver, Colo., a corporation of Colorado Application August 1, 1936, Serial No. 93,759

6 Claims. (Cl. 248—55)

My invention relates to an improved method for supporting cylindrical shells, such as penstocks, penstock headers, pressure conduits, manifolds, and other associated or analogous cylindrical shells. Since the thickness of the cylinder walls employed in the previously named cylindrical shells is very thin in comparison to their diameter, the means of supporting these shells presents an extremely difficult problem to be solved. An enumeration of the problems encountered in such installations and the manner in which my invention solves these problems will be described herein.

As a specific example of the size and conditions encountered in the installation of penstock and header systems of our more modern power plants, the penstock and header system at Boulder Dam on the Colorado River is cited. Four main penstock headers, each of which is 30 feet internal diameter, with the two headers in the lower tunnels having a maximum shell thickness of $2\frac{11}{16}''$. Four penstock branches extend from each header to the 115,000 horsepower turbines in the power house. These penstocks and headers are symmetrically disposed in opposite sides of the canyon walls. Two of these 30-foot penstock headers are enclosed in tunnels at an elevation of approximately 150 feet above the river level and will operate under a maximum pressure of 185 pounds per square inch whereas the other two 30-foot penstock headers are at approximately river level and will operate under a maximum pressure of nearly 300 pounds per square inch.

Most of this installation consists of "laying assemblies" so large in size that it was impossible to fabricate sections and then ship them to the project. This made it necessary to erect a complete fabrication shop, and manufacture this equipment adjacent to the rim of the canyon. This quadruple penstock system will, when completed, weigh nearly one hundred million pounds, and will require an expenditure of approximately twelve million dollars.

Pipe sizes as encountered in Boulder Dam are not common; however, the problems encountered in this particular instance are common to all installations of this type. Since my invention is not employed at Boulder Dam, my reason for citing this penstock and header system is that it is an example of the type of installation for which my invention is adapted.

In addition to the power plant installations, my invention is readily applicable to modern irrigation and domestic aqueduct systems where fluid is transported within a circular metal conduit. The structural rigidity of my supporting means makes it particularly well adapted to sloping pipes such as are encountered in constructing syphons for aqueducts or irrigation conduits. Further, my invention is readily applicable to horizontal cylindrical storage tanks such as are used for the storage of gasoline, oil, or other fluids.

In fact, my invention is applicable as a supporting means for all cylindrical shells which are longitudinally supported, regardless of whether they lie in a horizontal or angular plane.

By slightly modifying the elements of my invention the principle embodied therein is readily applicable to semicircular troughs to be used as flumes or as a guiding means for the transportation of materials or vehicles.

The modern practise in laying penstocks, conduits, etc., is to make up integral sections several hundred feet or more in length, and to have one end securely anchored in a concrete pier and have the opposite termination of this integral section connected to the adjacent section by means of a slip joint. This manner of construction is followed because the temperature variation with the attendant change in length of the conduit or penstock makes continuous integral runs of conduit undesirable, if not impossible, under certain conditions. The length of the integral sections is determined by the temperature variation in the particular locality and the amount of longitudinal movement acceptable for the particular installation. Since one end of the cylindrical shell is anchored and thus held stationary, longitudinal movement of the shell as a result of temperature changes will be either toward or away from the slip joint as the temperature rises or falls.

Since integral lengths of several hundred feet or more are used between the anchor and slip joint, intervening supporting means are necessary. Since these supporting members are rigidly secured to the cylindrical shell, they too will move as the pipe expands or contracts and in so doing must be slid along their supporting piers to compensate for the variation of the length of the supported shell. This requires that the supporting means be structurally rigid for the transmission of longitudinal motion as well as the actual supporting of the cylindrical shell.

Inasmuch as the supporting members and piers for large size pipes are necessarily of quite heavy and substantial construction and are accordingly costly to make, the obvious effort of engineers and designers is to place them as far apart as practicable, and herein lies the major difficulty in the construction of such works; for as the distance between piers is increased, so too is the deadweight of the pipe and enclosed fluid increased; hence, the problem of avoiding the concentration of stresses in localized portions of the pipe and supporting means is made more difficult.

Another element entering into this problem is the fact that the thickness of the metal composing the pipe shell, required to resist internal pressure is relatively thin in comparison to the pipe diameter, and in consequence the pipe is very flexible, limber, and unstable, allowing it to deform from its theoretically perfect cylindrical shape when the pipe is empty if stiffener rings are not applied.

During the early phases of filling a pipe not provided with stiffener rings, the deformation is accentuated by the increased weight therein, and it is not until the pipe is completely filled and pressure builds up in the interior that the shell again resumes its nearly true cylindrical shape. It has been found to be particularly desirable that the supports for the pipe shell shall be so constructed that they will prevent the deformation and restoration of the pipe shell during the filling or draining cycles as the case may be.

In the designing and constructing of large pipes as described herein, it is essential all the metal comprising the structure shall be used to the fullest possible extent, in order that a truly economical structure can be attained. As expressed in the law of structural action known as Poisson's ratio, stresses in metal in one direction may be alleviated in some instances or increased by but small amounts in other instances by the introduction of stresses normal to the major stresses. It is also worthy of note that the existence of a stress in one direction does not preclude the use of the material to support additional loads providing said additional loads induce stresses in a direction at right angles to the pre-existing stress, also, those portions of the completed structure wherein very low stresses are prevalent can most advantageously be employed to receive and disseminate the stresses imposed by external reactions, if they are applied to the zones where these low stresses prevail.

It is into these zones where, in conventional constructions, the prevalent stresses are low, or are disposed in a circumferential direction, that my invention transfers the external pier reactions and disseminates them into the pipe structure without undue localization of stress. Thus my invention more nearly approaches the ideal of having all the metal in the structure put to effective use, than any mode of construction of which I am aware.

An object of my invention is an improved supporting means for cylindrical shells which utilizes the nominally stressed portion of the supported element for the transmission of longitudinal or axial tension and compression stresses caused by temperature variation.

An object of my invention is an improved supporting means for cylindrical shells which utilizes the nominally stressed portions of the supported element for the transmission of longitudinal movement and the stress attendant thereto, caused by the sliding of the supporting element across stationary elements or piers.

An object of my invention is an improved supporting means for cylindrical shells, composed of: two or more circumferential ring elements rigidly secured to the supported element with sole plates attached thereon and having diaphragms interposed and rigidly attached to the supported element, stiffener rings and sole plates.

An object of my invention is an improved supporting means for cylindrical shells, having at or adjacent to the horizontal center line, diaphragms alined parallel to the line of flow; said diaphragms to be interposed between and rigidly connected to the stiffener rings, supported element and sole plates.

An object of my invention is an improved supporting means for cylindrical shells, wherein the aforementioned elements constituting the structure are arranged in such a manner that stresses originating at the points of support will be disseminated without concentration to all parts of the supporting structure.

An object of my invention is an improved supporting means for cylindrical shells wherein the supported element will not be restrained in such a manner or to such an extent that stresses of high intensity will be produced, as the pipe shell accommodates its cross-sectional shape to the various conditions encountered when the pipe is empty or only partially filled.

An object of my invention is an improved supporting means for cylindrical shells which will not impart additional longitudinal bending stress to the supported element, and for this reason will allow the full utilization of the supported element as a beam and so permit the use of maximum length spans between supports.

A further object of my invention is an improved supporting means for cylindrical shells wherein all of the elements constituting the support are simple, economical, and easily manufactured.

With the foregoing citations and objects of my invention in view there will now be described specific embodiments of the invention for the purpose of satisfying the patent statutes and explaining the manner in which I attain the aforementioned objects. My invention has been illustrated in the accompanying drawing forming a part hereof and, wherein:

Figure 1 is an isometric elevation showing a pipe shell, stiffener rings, sole plates, diaphragms, and supporting piers; and Figure 2 is a transverse section taken on the plane 2—2 of Figure 1, normal to the plane of fluid flow.

In the accompanying illustrations which depict the embodiment of my invention, the pipe shell 1 is encircled by the stiffener rings 2 and 3 having the protruding lugs 4 to which are attached the sole plates 5 and 6. The diaphragms 7 and 8 are rigidly attached to the pipe shell 1, stiffener rings 2 and 3, and their respective sole plates 5 and 6. The aforementioned elements rest on the stationary pier plates 9 which are securely retained on the piers 10.

In order to fully understand the function of my invention, it is necessary that the primary stresses found in penstocks or conduits carried on piers or similar supports be clearly understood, and for this reason an enumeration of the various stresses encountered in installations of this type are here given; they are as follows:

*a.* Circumferential or "hoop" tensile stresses produced by fluid pressure acting against the interior of the conduit walls normal to or at right angles with the path of fluid flow, which tend to produce bursting or rupture.

b. Longitudinal bending stresses produced by the weight of the pipe and enclosed fluid. In resisting this downward force at the center of the span between supports, the upper portion of the pipe will have a compressive stress and the lower portion will have a tensile stress; but since the pipe is essentially a continuous beam, at the points of support these stresses will be reversed, and the compressive stress will be at the bottom of the pipe, and the tensile stress at the top of the pipe. These stresses attain their maximum intensity at the top and bottom of the cylindrical shell, becoming less and less as they approach the horizontal center line of the pipe, and at the horizontal center line or neutral axis these bending stresses become zero. Similar conditions exist where the spans are not continuous.

c. Transverse shear forces through the pipe shell produced by the weight of the pipe and enclosed fluid. At the points of support the concentration of downward reaction, which is resisted by the supporting means, tends to produce a vertical shear force through the pipe shell.

d. Axial tension and compression stresses produced by variations in the length of the pipe shell which accompany temperature fluctuations of the pipe shell; and variations in the length of the pipe caused by its functioning in accordance with the law of Poisson's ratio. This functioning will cause shortening of the pipe with the increase in diameter due to the introduction of internal fluid pressure. Axial compression stresses will also be imposed on the pipe shell due to the action of gravity when the pipe is layed on an incline or slope.

From the foregoing analysis it will be noticed that the pipe shell contains portions which are quite nominally stressed despite the fact that other portions are highly stressed; for example, the horizontal bending stress is highest at the extreme upper and lower portions of the pipe shell, but is zero at the horizontal center line; therefore, the utilization of portions of the pipe, on or adjacent to, the horizontal center line for the transmission of longitudinal forces will not increase the stresses at a point where additional stress is objectionable.

In my invention I utilize this portion adjacent to the horizontal center line for the transmission of longitudinal stress by means of the diaphragms 7 and 8 which are rigidly connected to the pipe shell 1, stiffener rings 2 and 3, and the sole plates 5 and 6. This arrangement permits stresses which are produced when the pipe is slid across the stationary piers to be transferred to the pipe without introduction of dangerous secondary stresses.

For proof of this statement let us examine the stresses which will be produced within the pipe shell 1 and the supporting structure by the introduction of a force tending to move the pipe toward the right as on Figure 1. In order to overcome the frictional resistance between the stationary pier plates 9 and the sole plates 5 and 6 on the pipe support, a force parallel to the line of flow is induced in the sole plates by the diaphragms 7 and 8. These forces are eccentric with respect to the axis of the pipe and tend to cause rotation of the diaphragms 7 and 8, and the sole plates about axes normal to their respective planes. The diaphragm 7 will tend to rotate in a clockwise direction while the diaphragm 8 will tend to rotate in a counter-clockwise direction thereby inducing stresses which will act upward and inward on the stiffener ring 3 and downward and outward on the stiffener ring 2.

The equal and opposite forces exerted by the diaphragms on opposite sides of the stiffener neutralize the tendency of the rings to rotate but leave net vertical components tending to move the stiffener ring 3 upward and the stiffener ring 2 downward. The pipe shell 1 is the resisting means for this couple; and since the metal of the pipe shell is ideally disposed to resist this couple, the resulting increase in stress is small.

Reversal of the direction in which the axial force is applied to the pipe shell reverses the structural action as previously described, but does not alter the effectiveness of the support for the transmission of longitudinal stress.

When a pipe is subjected to internal pressure, it increases slightly in diameter because of the elastic yielding of the pipe shell which accompanies the development of tensile stresses necessary to restrain the internal fluid pressure. If the pipe shell is restrained locally against this expansion by some means, such as the stiffener rings 2 and 3, there will exist a zone adjacent to the restraining member where the pipe shell makes the transition from the restrained diameter to the unrestrained diameter. This transition involves a bending of the longitudinal element or pipe and gives rise to secondary stresses which are of sufficient importance to warrant care in preventing their becoming too great. The position of the diaphragms 7 and 8 between the stiffener rings 2 and 3 brings them to bear on the pipe shell within a zone which is already restrained and their presence, therefore, can have little effect in the development of secondary stress.

A multiplicity of rings as is used herein has a very marked advantage over a single stiffener ring, since it results in distributing the material in the stiffening and supporting member over a greater proportion of the pipe shell. Further, it will be noted that the diaphragms 7 and 8 contact the pipe shell 1 within a zone which is restrained and thus allow the transmission of the pier reactions to the pipe shell in a zone which has a lower "hoop" stress than zones which are not so restrained. It will also be noted that the diaphragms 7 and 8 have a considerable portion contacting the pipe shell 1 and therefore even though the pipe shell is relatively thin the stress will be well distributed along the metal of the pipe shell.

What I believe to be new is a combination of parts consisting of two or more rings having one or more diaphragms placed between them and mechanically connected to the rings and to the pipe shell when used for the purpose of obtaining longitudinal strength in a stiffening and supporting structure for a pipe or similar structure.

With the foregoing explanation of the principles and action of the pipe support understood, it is clear that I have fulfilled the objects of the invention as hereinbefore set forth.

While in the foregoing I have described the specific embodiments of my invention; it is, nevertheless, to be understood that in practising the same, I may resort to any and all modifications falling within the scope of the appended claims defining the invention.

What I claim and desire to secure by Letters Patent is:

1. In combination with a conduit, a load supporting structure which comprises a foundation having horizontal surface portions at opposite sides of said conduit, longitudinally spaced elements circumscribing the conduit and contacting therewith, said elements having a greater dimension radially of the conduit than longitudinally, bearing members connected to said elements and contacting said foundation surface portions at opposite sides of the conduit and diaphragms converging upwardly from said bearing members and secured to the conduit at approximately its horizontal center line, said diaphragms each being secured to a plurality of said spaced circumscribing elements and to one of said bearing members.

2. In combination, a hollow body of cylindrical contour, stationary reaction members at opposite sides of the conduit axis, means for transmitting the static load of said body and contained fluid to said members, said means including arcuate elements circumscribing said body and longitudinally spaced therealong, diaphragms at opposite sides of said body and engaging the body at zones of minimum stress and disposed between said circumscribing elements to which they are connected, and bearing members in contact with said reaction members and each connected to one of said diaphragms and to said arcuate elements.

3. The combination in a foundation supported conduit or the like, means for slidably supporting the conduit on the foundation comprising circumscribing rings held in spaced relation longitudinally of the conduit, elements at opposite sides of said conduit each interconnecting the rings and fixed to a surface of the conduit between the rings, and bearing members at opposite sides of the conduit each connected to one of said elements and engaging said foundation while accommodating sliding movement of said conduit relative thereto.

4. A support for conduits and the like comprising a foundation, members circumscribing said conduit and arranged in spaced relation longitudinally thereof, elements at opposite sides of said conduit each interconnecting the circumscribing members and fixed to a surface of the conduit between the members, and means connected to each of said elements and to said circumscribing members to form bearing portions disposed below the horizontal diametric axis of the conduit and in load-transferring engagement with said foundation, said interconencting elements diverging downwardly from their engagement with the conduit to their connections to the aforesaid means.

5. A support for a conduit or the like comprising two rings in circumferential engagement with said conduit and held in spaced relation longitudinally thereof, an element at each side of said conduit interconnecting said rings and fixed to the conduit between the rings, a foundation, and means including relatively movable parts intermediate each of said elements and said foundation whereby the conduit load is transmitted to said foundation.

6. In combination with a fluid-conducting body of arcuate formation, stationary reaction members at opposite sides of said body, means for transmitting the static load of said body and contained fluid to said members including arcuate elements in arcuate engagement with said body, diaphragms at opposite sides of said body engaging the body and connected to said arcuate elements, and bearing members in contact with said reaction members and each connected to one of said diaphragms and to said arcuate elements.

ROBERT E. GLOVER.